United States Patent [19]

White

[11] 4,127,926
[45] Dec. 5, 1978

[54] METHOD OF MAKING SOLAR REFLECTORS

[75] Inventor: George White, Asheville, N.C.

[73] Assignee: Whiteline, Inc., Asheville, N.C.

[21] Appl. No.: 807,236

[22] Filed: Jun. 16, 1977

[51] Int. Cl.² ............................................. B23P 11/02
[52] U.S. Cl. ...................................... 29/453; 126/270; 237/1 A; 350/293
[58] Field of Search .................. 29/453; 126/270, 271; 237/1 A; 350/296, 293, 295

[56] References Cited

U.S. PATENT DOCUMENTS

| 1,900,202 | 3/1933 | Scott | 350/296 X |
|---|---|---|---|
| 1,951,404 | 3/1934 | Goddard | 126/270 |
| 2,659,950 | 11/1953 | West | 29/453 X |
| 3,099,900 | 8/1963 | Beck | 29/453 X |
| 3,142,223 | 7/1964 | Vetter | 350/295 X |
| 3,277,884 | 10/1966 | Rowekamp | 126/270 |
| 3,990,430 | 11/1976 | Robertson | 126/271 |
| 4,015,586 | 4/1977 | Vroom et al. | 126/271 |
| 4,038,971 | 8/1977 | Bezborodko | 126/270 X |

Primary Examiner—Charlie T. Moon
Attorney, Agent, or Firm—John C. Blair

[57] ABSTRACT

A method of making a solar reflector from a flat rectangular sheet of reflecting material into a substantially a parabolic cross-sectional shape to form a part of a solar heat collecting system wherein the reflector is supported to concentrate the rays of the sun on a pipe through which liquid is circulated including bending permanently the sheet material along its longitudinal center line to give the two half portions thereof a minor angle with respect to a horizontal plane, bending the longitudinal edges back upon themselves to form slotted hook portions along the longitudinal edges of the sheet material and bending the two half portions toward each other below the breaking point of their elasticity to receive the longitudinal edges of a translucent plate in the slots of the hook portions whereby the parts are held in assembly.

4 Claims, 3 Drawing Figures

METHOD OF MAKING SOLAR REFLECTORS

BACKGROUND OF THE INVENTION

Over the years a variety of systems have been devised for the collection and utilization of solar energy. While many of these systems are quite efficient in accomplishing the objective, i.e. collecting and storing solar energy to supplement or replace more expensive systems utilizing common sources of energy, one primary problem remains, to wit the initial cost of making and installing an efficient solar energy collecting system. If a solar energy collecting system is very expensive to make and install, such high capital expenditure is discouraging, since the potential user must wait too long in amortizing this cost before realizing any savings in energy expense.

In my co-pending application Ser. No. 775,871 I disclose a solar energy collecting system which may be made from inexpensive materials with low labor cost in construction of the system and installation thereof. The simplicity of the structure of this system resulting in a low capital expenditure for initial installation makes such a system attractive simply because its low cost may be amortized over a shorter period of time; thereby the purchaser may look forward to actual savings in overall energy costs in a period of time which he can see and realize rather than some remote time which is discouraging to contemplate. The system devised in my above co-pending application involves a novel method for the making of the reflectors which it utilizes. This method is one of the important factors in reducing the overall cost of the system because of the utilization of inexpensive materials and the simplicity of the steps for assembling such materials into finished units which may then be incorporated into a solar energy collecting system at low cost.

An object of the present invention is to provide a method of making a solar reflector which is very economical because of the utilization of inexpensive materials.

Another object is to provide such a method wherein the steps for fabricating the few parts making up the assembly are simple and can be carried out inexpensively.

A further object of the invention is to provide such a method which involves very few steps to complete the assembly of the unit thereby reducing labor costs.

A final object of the invention is to provide such a method wherein the steps thereof can be carried out without utilization of expensive machinery, indeed one that can be accomplished with inexpensive standard tools.

Other objects, advantages and salient features of the present invention will become apparent from the following detailed description, which, taken in conjunction with the accompanying drawings discloses a preferred embodiment thereof.

In the drawings.

Similar reference characters refer to similar parts throughout the several views of the drawings.

Figure 1:
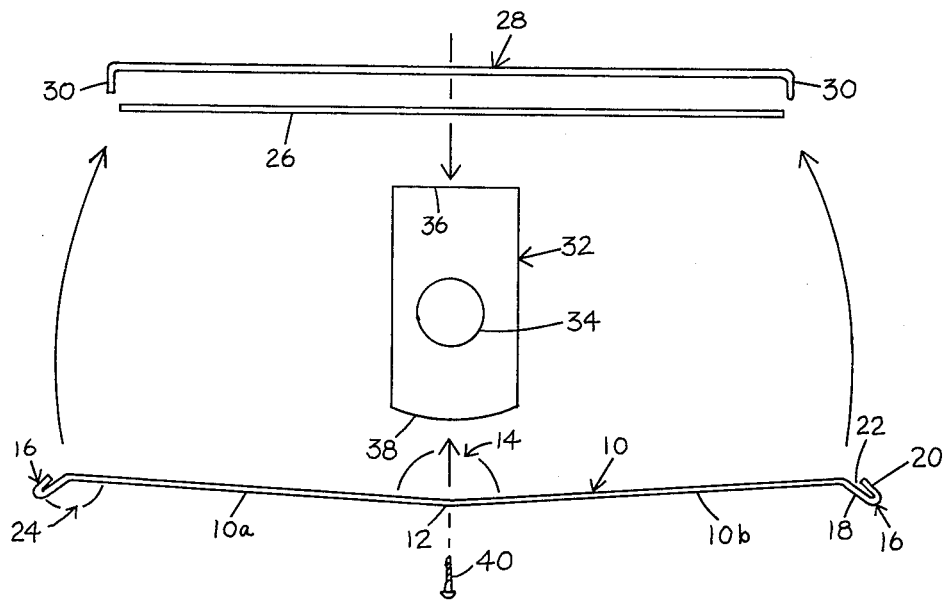
FIG. 1 is a vertical exploded elevation of the various parts of the reflector prior to assembly.

The method commences with a flat rectangular sheet of bright metal an example of which will be described in detail hereinbelow. A permanent bend is put along the longitudinal center line of this sheet so that the two halves of the sheet slope upwardly at a minor angle to the horizontal as seen in FIG. 1. Next the two longitudinal edges of the sheet are bent back upon themselves to form hooked portions. More particularly, as seen in FIG. 1, the half portions 10a and 10b of a sheet generally indicated at 10 are permanently bent upwardly along the center line 12 so that when the bending is completed the half portions 10a and 10b will be at a minor angle to the horizontal i.e. the angle 14 will be somewhat less than 180°. Next the hooked portions generally indicated at 16 on the longitudinal edges of half portions 10a and 10b are formed. This includes permanently bending portion 18 of the sheet downwardly as viewed in FIG. 1 and then bending the outer portion 20 back toward portion 18 to form a slot 22 between portion 18 and 20. The result is two hooked portions 16 extending downwardly at an angle 24 from the planes of half portions 10a and 10b. The bends in the sheet 10 to form hooked portions 16 have permanent angles 24 and the angle 14 on the sheet's center line 12 are advantageous in the method of assembling the parts into the completed unit and maintenance thereof.

Figure 2:
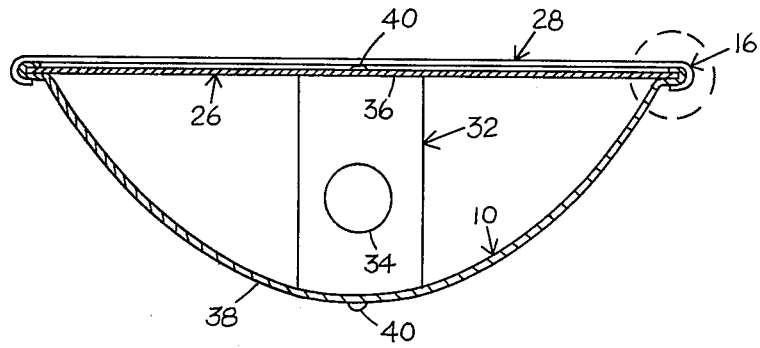
FIG. 2 is a vertical sectional view taken cross-wise of the reflector after assembly thereof and FIG. 3 is an enlarged fragmentary sectional view showing more clearly the details of the connection between the reflector plate, the translucent plate and straps which may be used to strengthen the assembled unit.
Figure 3:
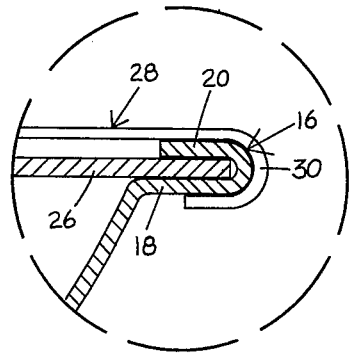

Next the half portions 10a and 10b of sheet 10 are bent upwardly as indicated by the arrows in FIG. 1 and a transparent sheet 26 is inserted in the slots 22 of the hooked portions 16 so that the parts assume a position which can be more readily understood from a consideration of FIG. 3. The dimensions and characteristics of sheet 10 are such that when the sheet 26 is inserted in the slots 22 of the hooked portions 16 of the sheet and portions 18 and 20 are substantially horizontal. Furtermore, as will be described in greater particularity later the characteristics of sheet 10 are such that this additional bending about the center line 12 to the position shown in FIGS. 2 and 3 does not extend beyond the point of of elasticity of sheet 10. Accordingly sheet 10 continuously exerts a positive force to return to the shape shown in FIG. 1 and this causes outer portions 20 of the hooked portions 16 to press against plate 26 thereby holding the parts together in the position shown in FIGS. 2 and 3.

Although not essential, the assembled reflector unit as achieved by practicing the steps described may be strengthened by use of transverse straps generally indicated at 28. The end portions 30 of straps 28 are bent preferably at right angles (FIG. 1). After assembly of the reflector sheet 10 and the transparent sheet 26 as described above, strap 28 may be placed crosswise on sheet 26. Next the end portions 30 are bent against the under portion 18 of the reflector 12 thereby holding the assembly in the position shown in FIGS. 2 and 3.

It is obvious that the sheet 10 may be made from a variety of materials which have proper reflecting qualities to utilize a maximum amount of solar energy. Also there must be proper elasticity to maintain the parts in the assembled positions shown in FIGS. 2 and 3. However, as an example, and without limiting the invention to these precise details, the sheet 10 may be made from an aluminum alloy which is marketed under the trademark, COILZAC. Such material is marketed by Coil Anodizers, Inc., P.O. Box 766, Muskegan, Mich. It is alloy Number 56757 "Temp. H25 Fin. T1--Clear Bright Anodized", having a thickness of 0.025 inches. It has been found in practice that this method may be expeditiously carried out by using sheets which are 2 feet wide by 8 feet in length. If a sheet 10 of this dimension is used, upon assembly as shown in FIG. 2 the distance between the top surface of the reflector sheet at its center line and the bottom surface of sheet 26 is about 6 inches. Further, in this circumstance angle 14 will be approximately 175° and and angle 24 will be 127°. When the method of this invention is practiced with the above materials and dimensions, the result is the formation of a complete reflector which is substantially parabolic in cross section. Such shape has been found to maximize the solar energy directed to the circulating pipe thereby increasing the amount of energy to be absorbed from the sun. Obviously the invention should not be limited to these details because other dimensions and materials may be substituted therefore to achieve like results. Accordingly, this is simply an illustrative way of carrying out the method of this invention.

Preferably, one or more blocks generally indicated at 32 are inserted between sheets 10 and 26 during assembly, as will be apparent from a consideration of FIGS. 1 and 2. These blocks have holes 34, a flat end 36 on which sheet 26 rests and a bottom surface 38 which is slightly arcuate to accomodate the surface of sheet 10 when assembled. They may be fastened in position by any convenient means such as screws 40 and circulating pipes (not shown) may be threaded through holes 34 in an obvious manner.

It will thus be seen that the objects set forth above, among those made apparent from the preceeding description, are efficiently achieved, and since certain changes may be made in the above method without departing from the scope of the invention, it is intended that all matter contained in the above description or shown in the accompanying drawings shall be interpreted as illustrative and not in the limiting sense.

It is also to be understood that the following claims are intended to cover all the generic and specific features of the invention herein described, and all statements of the scope of the invention, which, as a matter of language might be said to fall therebetween.

I claim:

1. In a method of making a reflector from a flat rectangular sheet of reflecting material into a substantially parabolic cross-sectional shape to form a part of a solar heat collecting system wherein said reflector is supported to concentrate the rays of the sun on a pipe through which liquid is circulated, the novel combination of steps comprising bending permanently said sheet substantially along its longitudinal center line so that each half portion of said sheet is at a minor angle to the horizontal bending the longitudinal edges of said sheet back upon themselves to form slotted hook portions bending said half portions of said sheet toward each other below the breaking points of their elasticity so that the open ends of the hook portions face each other and the elasticity of said portions urges them to return to their original bent position and inserting the longitudinal edges of a transparent sheet into said hook portions whereby upon release from bending said hook portions press against the top surface of said transparent sheet to hold the assembly together as a unit.

2. The combination of steps defined in claim 1 wherein the hook portions are bent at an angle which will make them substantially horizontal when assembled.

3. The combination of steps defined in claim 1 wherein a strap with hook portions on its ends is placed across said transparent sheet with its end portions extending around said hook portion of said reflecting material to assist in holding the assembly together as a unit.

4. The combination defined in claim 1 wherein the reflecting material comprises a polished sheet of metal.

* * * * *